United States Patent
Liberman et al.

(10) Patent No.: US 9,038,196 B2
(45) Date of Patent: May 19, 2015

(54) METHOD FOR AUTHENTICATING A USER REQUESTING A TRANSACTION WITH A SERVICE PROVIDER

(75) Inventors: Johann Liberman, Bry sur Marne (FR); Panos Chatzikomninos, Paris (FR); Jean Pascal Aubert, Geneve-Thonex (CH); Benoit Delestre, Paris (FR); Didier Hallepee, Mantes la Jolie (FR)

(73) Assignee: goSwiff France, Paris (FR)

( * ) Notice: Subject to any disclaimer, the term of this patent is extended or adjusted under 35 U.S.C. 154(b) by 0 days.

(21) Appl. No.: 13/696,489

(22) PCT Filed: May 4, 2011

(86) PCT No.: PCT/FR2011/051008
§ 371 (c)(1),
(2), (4) Date: Nov. 6, 2012

(87) PCT Pub. No.: WO2011/138558
PCT Pub. Date: Nov. 10, 2011

(65) Prior Publication Data
US 2013/0133086 A1 May 23, 2013

(30) Foreign Application Priority Data
May 6, 2010 (FR) ...................................... 10 53523

(51) Int. Cl.
*H04L 29/06* (2006.01)
*G09C 5/00* (2006.01)
*H04L 9/32* (2006.01)

(52) U.S. Cl.
CPC *H04L 63/10* (2013.01); *G09C 5/00* (2013.01); *H04L 9/3228* (2013.01); *H04L 9/3247* (2013.01); *H04L 9/3297* (2013.01); *H04L 2209/56* (2013.01); *H04L 2209/80* (2013.01)

(58) Field of Classification Search
None
See application file for complete search history.

(56) References Cited

U.S. PATENT DOCUMENTS 7,578,436 B1 * 8/2009 Kiliccote ...................... 235/380
2002/0138450 A1 9/2002 Kremer
(Continued)

FOREIGN PATENT DOCUMENTS

| CN | 101436280 | 5/2009 |
|---|---|---|
| FR | 2 852471 | 9/2004 |
| WO | WO 2010/116109 | 10/2010 |

OTHER PUBLICATIONS

International Search Report for PCT/FR2011/051008, 2012.
(Continued)

*Primary Examiner* — Minh Dinh
*Assistant Examiner* — Devin Almeida
(74) *Attorney, Agent, or Firm* — B. Aaron Schulman, Esq.; Stites & Harbison, PLLC.

(57) ABSTRACT

The present invention relates to a method for authenticating a user (Ui) requesting a transaction with a service provider (SP), which comprises: using authentication data ($d_{auth}$) read on a screen by means of a mobile terminal (TEL) to generate (E) an authorization code (cod.) that is specific to the user and to the requested transaction; reading (F) the authorization code, displayed by the mobile terminal, using a reading means of a digital device (PC); and sending (G) the read authorization code from said digital device to the service provider in order to authenticate the user.

14 Claims, 5 Drawing Sheets

(56) References Cited

U.S. PATENT DOCUMENTS

2002/0178385 A1* 11/2002 Dent et al. .................... 713/202
2007/0220597 A1    9/2007 Ishida
2009/0283589 A1   11/2009 Moore et al.
2009/0293112 A1   11/2009 Moore et al.
2011/0026716 A1    2/2011 Tang et al.

OTHER PUBLICATIONS

Written Opinion of the International Searching Authority for FR2011/051008, 2012.
Office Action dated Jan. 22, 2015 issued in corresponding Chinese Application No. 201180034128.4.

* cited by examiner

METHOD FOR AUTHENTICATING A USER REQUESTING A TRANSACTION WITH A SERVICE PROVIDER

The invention relates to the field of authentication, particularly in a context of providing secure online services and access for bank transactions.

The need to identify a user requesting a service, and to authenticate this user, became truly apparent with the growth of the internet and mobile services. While identification consists of communicating an identity, authentication consists of providing proof of this identity.

In information system security, authentication is said to be "strong" when it uses an identification procedure requiring the concatenation of at least two authentication elements or "factors" chosen from among what the entity to be authenticated knows, what it holds, or what it is.

Strong authentication is one of the basic elements to guaranteeing access control or authorization for a service (who can access it), confidentiality (who can see the service), integrity (who can modify the service), and traceability (who has accessed it).

A true strong authentication technology must also guarantee non-repudiation, which is essential to being able to uniquely attribute actions to an entity, whether an individual or an organization. An entity authenticated with strong authentication cannot deny having had access to a system or having signed a document to the extent that it is the only entity to hold the secret allowing it to do so.

Techniques based on a "shared secret", which are often wrongly considered to be high level strong authentication techniques, do not ensure non-repudiation.

In particular, the conventional method of unique authentication symbolized by an identifier/password pairing, which is currently the system most commonly used to identify a user, has certain security weaknesses.

The different levels of authentication (simple or strong) must be chosen according to the level of contractual agreement that an entity wants to apply and the resulting legal impacts.

In particular, a contractual agreement for the procedure is understood here to mean the fact of bestowing a contractual value on an electronic procedure, combined with the ability to manage the proof if a conflict arises.

Concerning the security requirements for the accesses imposed by different supervisory authorities in the various domains, the three following layers of trust service must be considered: authentication, electronic signature, and timestamping. However, and as indicated above, it is not easy to meet all the requirements necessary to implement these three trust layers.

In authentication, the choice of an authentication method appropriate to each need (for example for a particular clientele or customer base, in particular for online banking access and secure financial services) will be based on a certain level of contractual agreement defined by a risk analysis that factors in the cost of the authentication methods to be used, the cost related to the various risks (sensitivity of the application, of the data, etc.) and the expected benefits for the user (according to level of expertise).

The following different levels of contractual agreement can be given as examples:

Contractual Agreement Level 1:
This first level, better than an identification by a simple identifier/password pairing, is based on the implementation of a low level authentication solution equivalent to a pseudo-strong authentication.

Contractual Agreement Level 2:
This level can be defined when organizational and technical means are applied to best guarantee the identity of the various players (for example users and/or third parties authorized for an e-bank or e-vault service).

This level enters within the sphere of strong authentication, but only to the first degree as it does not offer proof in the legal sense of the word.

Contractual Agreement Level 3:
A third level of contractual agreement can be defined when entering within the boundaries of strong authentication, where the degree of authentication (second degree) is legally admissible even if, when contested, the proof of its reliability remains to be provided by the entity that implements it.

Contractual Agreement Level 4:
The last level of contractual agreement, which we will describe as presumed reliable, guarantees non-repudiation in addition to the requirements which a strong authentication system must meet.

With this level of contractual agreement, the numerous technical and organizational techniques that must be satisfied are difficult to unite, but the legal value of such a method is presumed to be reliable. This is the highest level of strong authentication. This level of contractual agreement is what is used when deciding to implement a "qualified electronic signature" system presumed to be reliable.

Today there exists a wide variety of means for secure authentication, such as USB keys, tokens, card readers, etc.

In addition to being costly, these means do not prevent all identified attacks. In addition, significant logistical means are required in order to deliver these means and render them operational at the user's end.

An object of the invention is to solve the above problems.

In particular, the invention aims to provide a user-friendly, intuitive, secure authentication system that is usable by most customers.

The invention also aims to create a context for secure transactions, able to ensure the transport and encryption/decryption of dynamic data and the presentation of these data to a server for processing, validation, time stamping, and legal archiving of this transaction for uses requiring a high trust level.

In particular, the invention aims to allow utilizations and services requiring a high level of security, such as electronic signature and payment, combined with a non-repudiation option.

For this purpose, the invention proposes a method for authenticating a user requesting a transaction with a service provider, said method comprising: using authentication data read on a screen by means of a mobile terminal to generate an authorization code that is specific to the user and to the requested transaction; reading the authorization code, displayed by the mobile terminal, using the reading means of a digital device; and sending the read authorization code from said digital device to the service provider in order to authenticate the user.

The specific character of the authorization code so generated prevents its reuse by a malicious user in a later transaction. In addition, the act of reading both the authentication data and the resulting authorization code, with means such as a mobile terminal or a computer, makes the authentication process more ergonomic and avoids the data entry errors the user may make when he has to enter codes that are sometimes very long.

Advantageously, the authorization code is generated by signing the read authentication data using a secret code entered by the user on the mobile terminal, which more reliably authenticates the user requesting the transaction.

In a particularly advantageous embodiment, the authorization code is generated by additionally signing the authentication data using identification data of the mobile terminal, which allows ensuring strong authentication.

In a particularly advantageous embodiment, the generated authorization code is encoded as an image, in particular a matrix barcode, before being displayed by the mobile terminal. The use of such an image prevents a malicious third party from intercepting the authorization code by observing the mobile terminal without the knowledge of the user.

In another embodiment, the authorization code is read by means of a near field communication wireless technology.

In another embodiment, the method comprises the transmission of the read authentication data from the mobile terminal to the authentication server (AS), the generation of the authorization code from the authentication data on the authentication server, and the transmission of the generated authorization code to the mobile terminal. This embodiment reduces the calculations that must be performed on the mobile terminal.

Advantageously, the read authentication data is interpreted in the mobile terminal by means of a personalized application specific to the user and downloaded from an authentication server, said personalized application generating the authorization code from the read authentication data.

More particularly, the method additionally comprises a prior enrollment step, during which an activation code is sent to the mobile terminal, followed by an activation step during which the personalized application is downloaded to the mobile terminal, this activation code being used during the activation step to activate the downloaded personalized application, which allows the user to choose when he wants to activate the personalized application.

In one embodiment, the enrollment step comprises a step of verifying the identity of the user before sending the activation code, and only sending the code if said verification is positive.

In another embodiment, the activation step comprises the transmission of at least one confidential data item specific to the user of the mobile terminal, this confidential data item being used to encrypt the authentication data in the mobile terminal before its transmission to the authentication server and/or to decrypt the authorization code received by the mobile terminal. The transfers of the authentication data to the authentication server, and of the authorization code to the mobile terminal, are thus secure.

In another embodiment, the method comprises the generation, during the prior enrollment step, of the personalized application and/or the confidential data as a function of at least one internal identification data item generated from at least one personal identification data item sent by the user to the service provider.

In an advantageous embodiment, the authentication data are generated, by the service provider, as a function of data related to the transaction and personal data received from the user, which prevents the reuse of such authentication data by a malicious user during a later transaction.

In a second aspect, the invention proposes a system for authenticating a user requesting a transaction with a service provider, said system comprising a screen arranged to display authentication data received from the service provider, a mobile terminal comprising means for entering the authentication data displayed on the screen and display means arranged to display an authorization code specific to the user and to the requested transaction, and a digital device comprising input means able to read the authorization code displayed by the mobile terminal and to send this authorization code to the service provider in order to authenticate the user.

Advantageously, this authentication system additionally comprises an authentication server as described above.

In one particular embodiment, the authentication system comprises a service server, used by the service provider to provide a service requested by the user, this service server comprising a receiving module arranged to receive at least one personal data item of the user and the authorization code sent by the user, calculation means arranged to generate at least one internal identification data item from at least one of the personal data items received, and a transmission module arranged to send the generated internal identification data item to the authentication server.

Figure 1A:
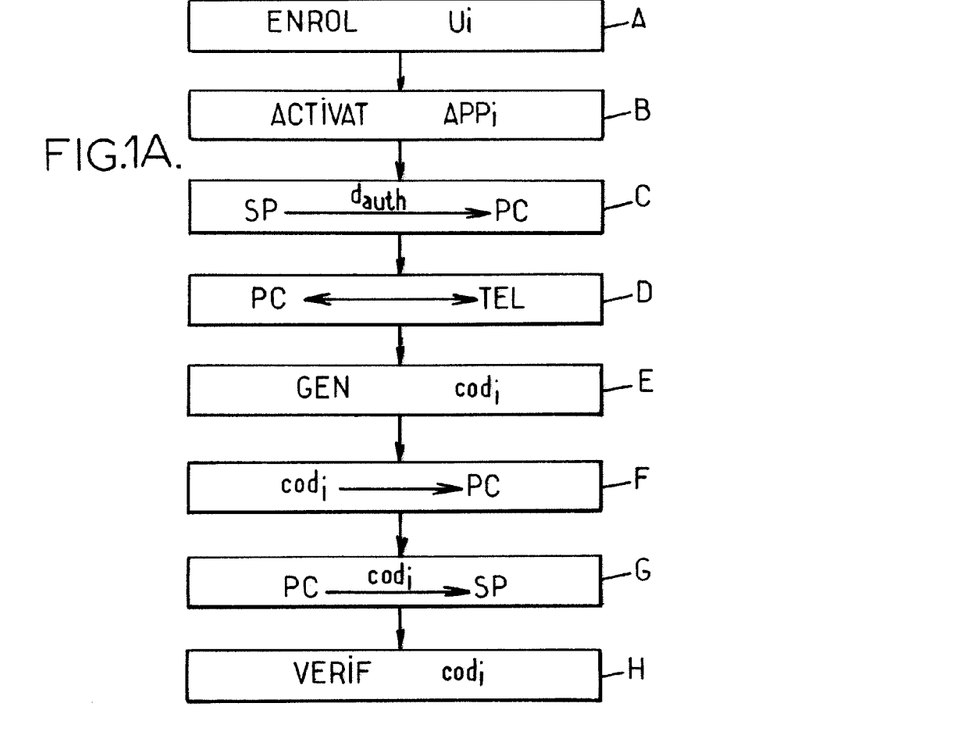
FIG. 1A represents the steps of an authentication method according to the principle of the invention.

Other features and advantages of the invention will be further apparent from reading the following description. This is purely illustrative and is to be read with reference to the attached drawings, in which:

FIG. 1A illustrates the steps of an authentication method according to the principle of the invention.

This method can start with a step A of enrolling a user Ui at a service provider with which the user wants to make a transaction.

At that moment, the user Ui will send to this service provider (for example to a service server SP managed by this service provider) a certain amount of personal identification data (referred to here as "$d_{id}$"), for example by entering them on his computer using a client application associated with the server SP of the service provider.

Such personal data $d_{id}$ serve to formally identify the user Ui when he enrolls in a service.

Once the server SP has received these personal data, they are verified by the service provider in order to be able to guarantee later on that the user Ui is indeed the actual user.

Such a verification can be made based on already known data if the user is already known (from data present in a bank statement for example), by a telephone call from an operator, or by requesting a copy of a government-issued proof of identity for a new user.

Once verified, these personal data are stored securely, for example on the server SP of the service provider or on another server delegated to this task.

After the user Ui is enrolled with the service provider, a step B of activating a personalized application, generated specifically for the user Ui, on a mobile terminal belonging to the user Ui can be carried out at this point to allow the user Ui to use his mobile terminal in the authentication procedure with the service provider. An example of such an activation step is described below.

Once the user Ui is enrolled with the service provider and equipped with a mobile terminal having a personalized application usable for his authentication, the user Ui is ready to enact a transaction requiring authentication with the service provider.

To do this, the method comprises a step C of displaying authentication data (denoted $d_{auth}$ below) on a screen SCN to which the user Ui has access. Such a screen may of course be the screen connected to the personal computer of the user Ui, in which case the authentication data $d_{auth}$ is sent beforehand from the server SP of the service provider to this personal computer for display on this screen. This screen may also be a television screen or even a screen of a mobile telephone.

The transmission of this authentication data can be dependent upon the server SP receiving a transaction request originating from the personal computer of the user Ui. For example, the user Ui can use his personal computer to access a customer application associated with the service provider (for example using the internet site of this provider) and to indicate his intention to make a transaction. After he indicates this, the server SP generates and send the authentication data to the personal computer of the user Ui.

The authentication data $d_{auth}$ displayed during step C may be in the form of a matrix barcode, a tag, a one-time password (OTP), a near field communication (NFC) message, or other.

Preferably, when a matrix barcode or a tag is used, the graphical representation of this matrix barcode or tag meets current standards, for example such as QR-Code, Datamatrix, PDF 417, or Microsoft tag.

Advantageously, the authentication data $d_{auth}$ sent by the service provider is generated specifically for the transaction requested, as a function of data linked to the transaction and possibly personal data received from the user.

It is advantageous if this authentication data $d_{auth}$ is for one-time use and is generated at each transaction so that it is different for each requested transaction. Knowledge of this authentication data if intercepted by a malicious user therefore does not allow such a user to utilize this information for later transactions.

After the display of the authentication data $d_{auth}$, the user Ui uses his mobile terminal to enter the authentication data during a read step D, so that it can be interpreted by the personalized application previously activated during step B.

In a first embodiment, this authentication data $d_{auth}$ is read by the user Ui, who enters it manually on his mobile terminal. This first embodiment is particularly appropriate when the mobile terminal of the user does not have its own reading means such as a camera.

In another embodiment intended to limit user interaction, a potential source of error, the authentication data $d_{auth}$ is read directly by the mobile terminal, which has its own reading means.

Thus, when the mobile terminal has a camera, the user Ui can take a picture of the authentication data $d_{auth}$ displayed on the screen, and the application activated in the software will use the image to find the relevant data in the authentication data and interpret them.

Alternatively, when the mobile terminal has an NFC reader, this reader can read authentication data $d_{auth}$ presented as an NFC message by using near field communication wireless technology. This alternative avoids having to aim the mobile terminal accurately at the screen SCN.

After reading the authentication data $d_{auth}$ and interpreting the data in the mobile terminal of the user Ui, an authorization code cod is generated then displayed by the mobile terminal, during a code generation step E. This code $cod_i$ serves to authenticate the user Ui with the service provider.

Similarly to what has been said concerning the authentication data, the authorization code $cod_i$ is advantageously encoded in the form of an image, a matrix barcode, a one-time password (OTP), an NFC message, or other.

This step E of generating the authorization code can be implemented according to different embodiments.

In a first embodiment, an "offline" embodiment, the authorization code $cod_i$ is generated completely by the personalized application installed on the mobile terminal, which allows using this mobile terminal without it necessarily being connected to the mobile network and limits the transfers of sensitive data which could be intercepted by a malicious third party.

In such a mode, the personalized application interprets the read authentication data $d_{auth}$ and generates from the interpreted data an authorization code $cod_i$ which is displayed by the mobile terminal.

In addition to the authentication data $d_{auth}$, the personalized application may also use a secret code entrusted to the user for generating the authorization code, which reinforces the link to the user of this authorization code.

Thus, in a particular and advantageous embodiment, the authorization code $cod_i$ is generated, by the personalized application installed on the mobile terminal, from the authorization data $d_{auth}$ read by the mobile terminal and from a secret code assigned to the user, this secret code being usable for signing the authorization data $d_{auth}$ in order to obtain an authorization code $cod_i$ for one-time use, in the form of a one-time password.

In particular, the authorization code $cod_i$ can be generated by signing the read authentication data $d_{auth}$ by means of such a secret code entered by the user on the mobile terminal TEL, this secret code being known on the authentication server AS, in order to allow decrypting this authorization code. Such an authorization code is not only specific to the transaction requested, but serves to authenticate the user requesting this transaction.

In another particularly advantageous embodiment, the authorization code $cod_i$ is generated by signing the authentication data $d_{auth}$ using not only the secret code of the user, but also identification data of the mobile terminal (for example its IMEI number), which allows verifying, during the subsequent verification step, that the transaction is indeed associated with this user Ui and that it is indeed the user Ui who generated the authorization code.

In this manner strong authentication can be performed with two authentication factors, using both a secret code (which authenticates what the user Ui "knows", the first authentication factor) and an identifier of the mobile terminal (which authenticates what the user "has", the second authentication factor).

In addition to the user's secret code and the identification data for the mobile terminal, timestamp data may also be used for signing the authentication data $d_{auth}$, which adds further complexity to the authorization code $cod_i$ and allows dating the moment the transaction was authenticated.

In a particular embodiment, the authorization code $cod_i$ is advantageously encoded as an image, for example as a matrix barcode or tag. The authorization code is then not directly readable by a person, which prevents the authorization code being visually intercepted by a malicious user who is able to see the screen of the mobile terminal, while allowing it to be read when it is displayed by the mobile terminal, by optical reading means able to read this type of barcode.

This embodiment also allows using authorization codes of significant length (for example 256 characters) which are very specific and more secure than authorization codes which must be entered manually by a user and are therefore limited in length to reduce user input errors.

Such an embodiment is particularly suitable for encoding a complex authorization code $cod_i$ generated by signing the authentication data using the user's secret code, identification data of the mobile terminal, and timestamp data.

Once this authorization code is generated, it is displayed on the mobile terminal to allow its capture by a digital device PC of the user Ui, during a step F of reading this authorization code $cod_i$.

The digital device PC used to read this authorization code can be a personal computer comprising reading means able to read this code (for example a webcam, digital camera, or NFC reader), or even a mobile telephone comprising reading means (for example a digital camera or NFC reader) able to capture an image of the authorization code $cod_i$.

Here again, the authorization code can be read using a near field communication (NFC) type of wireless technology, to avoid the need to accurately aim the reading means of the digital device PC at the mobile terminal.

In a particular embodiment, the screen SCN on which the authentication data $d_{auth}$ is read during the reading step D, can be part of the same digital device PC as the reading means used to read the authorization code $cod_i$.

With such reading means, it is then possible to enter the authorization code $cod_i$ directly on the digital device PC simply by reading the authorization code displayed by the mobile terminal by means of these reading means.

In the embodiment where the authorization code $cod_i$ has been encoded as an image (particularly in the form of matrix barcodes) before being displayed by the mobile terminal, the image is then read by the reading means of the digital device so it can then be sent to the server SP of the service provider. In an advantageous embodiment, this read image can be decoded at the digital device PC, for example using form recognition, in order to find the authorization code $cod_i$ and send this code in decoded form rather than in the form of an image.

This is advantageous compared to an embodiment consisting of the user reading this authorization code himself and entering it manually on his personal computer, which requires an authorization code sufficiently readable and memorable for a human, meaning a relatively simple code such as alphanumeric characters.

Taking the example of a user having downloaded the personalized application from his financial institution and now connecting to his online banking site, when he wants to access his personal accounts he will launch the personalized application and enter his secret code in order to generate an authorization code for one-time use. If the generated authorization code is in the form of an image, meaning when this authorization code is encoded as an image (for example in the form of a matrix barcode), the user then presents this image to a webcam connected to his personal computer, so that this image can be automatically sent to the bank server in order to allow or disallow his connection.

In another embodiment referred to as an "online" embodiment, the authorization code $cod_i$ is generated in a server separate from the mobile terminal, which then simply interprets the read authentication data and possibly formats and encrypts it before sending it to this server, which generates the authorization code $cod_i$ as a function of the authentication data $d_{auth}$ it receives via the mobile terminal and sends this authorization code to the mobile terminal where it is displayed. Depending on the case, the mobile may send this authorization code directly, or may translate it and process it before sending it to the authentication server.

Once the authorization code $cod_i$ is read by the digital device of the user Ui, the transaction data as well as this authorization code $cod_i$ are sent (step G) to the server SP of the service provider which will perform the verification (step H) of this code in order to authenticate the user Ui and allow the transaction if this authentication is correct.

Figure 1B:
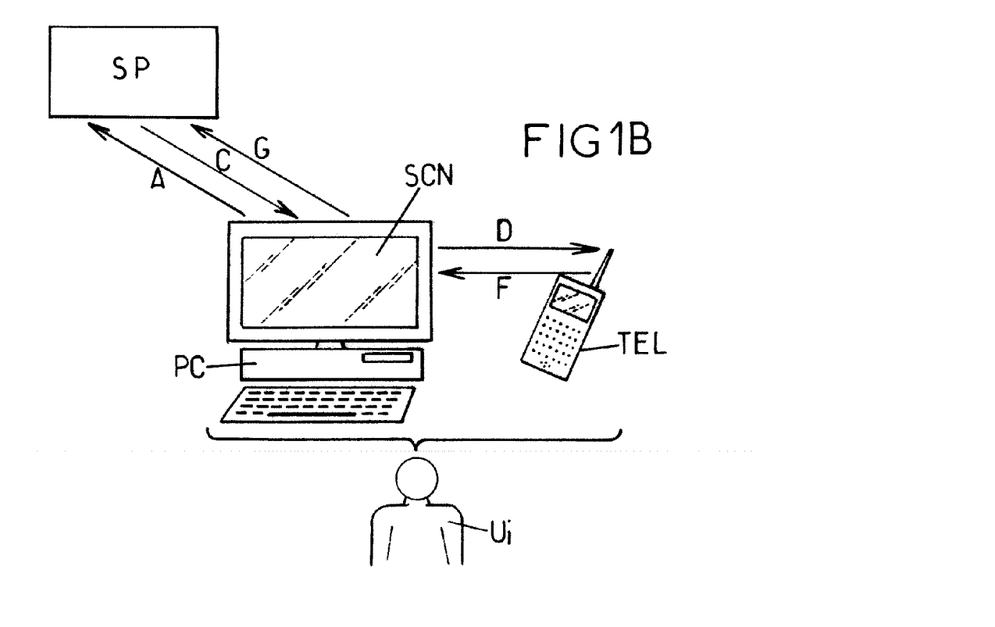
FIG. 1B illustrates a system according to a first embodiment, an "offline" embodiment, implementing the authentication method of the invention.

FIG. 1B illustrates a system according to a first "offline" type of embodiment, implementing the authentication method of the invention as described above for FIG. 1A.

Such a system comprises a server SP that belongs to the service provider, connected to the personal computer (PC) of the user Ui, for example by the Internet.

This personal computer has a screen SCN which is used to display the authentication data $d_{auth}$ sent by the server SP, as well as reading means (for example a webcam or an optical scanner) which allow reading an authorization code displayed by a mobile terminal.

In addition to the above elements, the invention uses a mobile terminal TEL such as a mobile telephone, a smart phone, a digital music player, etc. belonging to the user Ui, on which is installed an application capable of interpreting the authentication data and which has display means (such as an LCD screen) on which an authorization code can be displayed.

In this FIG. 1B the various exchanges made during the method described in FIG. 1A are described. In particular, it indicates the data flows corresponding to the prior enrollment step A, the step C of sending authentication data, the step D of the mobile terminal reading the data, the step F of reading the authorization code on the personal computer, and the step G of sending the captured code to the server SP.

Figure 2A:
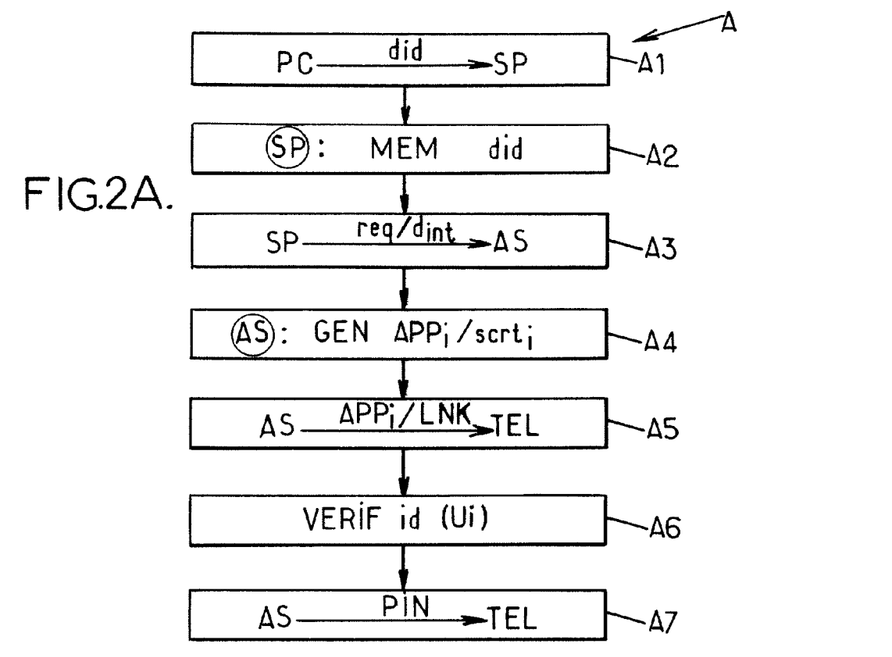
FIG. 2A represents the substeps of the enrollment step in the authentication method according to the principle of the invention.

FIG. 2A illustrates the substeps of the enrollment step A according to an embodiment of the invention using an authentication server AS.

During a first substep A1, the user Ui sends to the server SP of the service provider a certain amount of personal identification data $d_{id}$, for example by entering them on his computer using a client application associated with the server SP of the service provider.

These personal identification data $d_{id}$, once received by the server SP, are saved during a save substep A2.

Then, during a substep A3, the server SP of the service provider sends a request req to an authentication server AS so that the latter generates certain elements to be used to authenticate the user.

In a first embodiment, this authentication server AS can correspond to the server SP of the service provider on which additional authentication functionalities have been installed. With this first embodiment where the functionalities of authentication, identification, and providing services are integrated within the same server, all the exchanges between the authentication and service providing modules take place within the same secure environment, which enhances the security of the system.

In a second embodiment, this authentication server AS is a server separate from the server SP of the service provider. In this case the authentication functionalities are deliberately separated from the transaction and service providing functionalities, which allows an operator outside the service provider to manage the authentication, the service provider not necessarily having the technical skills or the capacity to manage this authentication.

In this second embodiment, the request req is accompanied by a certain amount of internal identification data $d_{int}$ on the user, based on personal identification data received by the server SP but different, to allow generating elements to be used to authenticate the user on the authentication server AS while guaranteeing the anonymity of the user on that server.

Thus, to the extent that the only sensitive personal data about the user are stored in secure areas on the server SP of the service provider, they are out of reach of any malware accessing the authentication server AS.

After receiving the request req, the authentication server AS generates (substep A4) the personalized application $APP_i$ which will be used to interpret the authentication data $d_{auth}$ and which is intended to be installed on the mobile terminal TEL of the user.

Such a personalized application $APP_i$ may, for example, contain a certain number of personalized elements which allow personalizing the application to render it specific to the user Ui. For example, this personalized application may contain the password signature for the user as well as an algorithm for verifying this password.

These personalized elements specific to the user Ui are "hard-coded", i.e. they are not modifiable, in the personalized application and are specific to the user.

In an advantageous embodiment which allows deferred activation of this personalized application, this application $APP_i$ also contains an algorithm for verifying an activation code (PIN).

The valid period of the personalized application $APP_i$ is configurable by the operator of the authentication server AS according to the service provider concerned and based on the requirements of this service provider.

Still during this generation substep A4, the authentication server AS may also generate a certain amount of subsequent confidential data, indicated by the abbreviation "$scrt_i$" in FIG. 2A, as a function of the identification data received by the server AS:
- user identifier and password;
- activation code PIN for the personalized application;
- key for storing information for the mobile terminal;
- one or more encryption key(s) for exchanges between the mobile terminal TEL and the authentication server AS;
- one or more signature key(s) for the user, if necessary.

These confidential data $scrt_i$ are specific to the user Ui and are generated from internal data $d_{int}$ which themselves were generated from personal identification data $d_{id}$ concerning the user, for example at the same time as the personalized application $APP_i$. These confidential data $scrt_i$ are intended to be transmitted to the mobile terminal TEL of the user Ui.

Each separate user Ui enrolling with the service provider therefore has confidential data $scrt_i$ distinct from the other users. Copying the personalized application $APP_i$ to a mobile terminal other than the terminal of the user Ui is therefore useless without the confidential data $scrt_i$ generated by the server AS.

Similarly, copying the confidential data $scrt_i$ to a mobile terminal other than the terminal of the user Ui renders these confidential data $scrt_i$ unusable by this other mobile terminal.

In an advantageous embodiment where the confidential data $scrt_i$ comprise an encryption key used to encrypt the exchanges between the mobile terminal TEL and the authentication server AS, this encryption key is composed of at least a first key for the user Ui and a second key for the authentication server AS.

In a particular embodiment of user enrollment where the generated personalized application $APP_i$ is directly downloaded, the method continues in a step A5 of downloading the personalized application $APP_i$ to the mobile terminal of the user Ui. This personalized application $APP_i$ can be activated later on using an activation code PIN if this later activation option is chosen.

In another alternative embodiment where the downloading of the personalized application $APP_i$ by the mobile terminal does not take place directly during user enrollment, step A5 then no longer comprises the download but includes sending the mobile terminal of the user Ui a download link pointing to the personalized application $APP_i$, after the generation of this personalized application.

Such a download link, for example a URL, can be sent by means of SMS, email, or a local connection such as WiFi, Bluetooth, or NFC.

This alternative embodiment allows the user to decide when to do the actual download. Using SMS to provide the link allows an immediate process that does not need to know the availability of the user and does not require network coverage, unlike a direct download.

Next, in an advantageous embodiment presenting an increased level of security, an activation code PIN (generated during step A4) is sent to the mobile terminal in a step A7. This activation code PIN allows guaranteeing end-to-end authentication with no initial hole, from enrollment in the service to its later use, in order to certify that only the user Ui could have performed these operations.

The sending of this activation code PIN may be subject to verification, by the authentication server AS, of the identity of the user during a verification step A6 preceding such a sending. For example, such verification may consist of sending the authentication server AS an image of a government-issued proof of identity of the user Ui, via a webcam of this user's computer or the camera of his mobile terminal TEL, and the server AS verifying that the data displayed in this image do indeed correspond to the user Ui.

Thus, in an advantageous embodiment of the invention, after this enrollment step, the mobile terminal TEL has been provided a link for downloading a personalized application capable of managing the authentication of the user Ui as well as an activation code PIN to allow activating such a personalized application.

When the servers SP and AS are separate, the server SP of the service provider stores the personal data of the user Ui, which are only known to this server SP in order to guarantee their confidentiality, and conversely, the authentication server AS only knows the internal identification data sent with the request from the service provider. This separation of data between different servers allows guaranteeing better resistance to attacks.

Figure 2B:
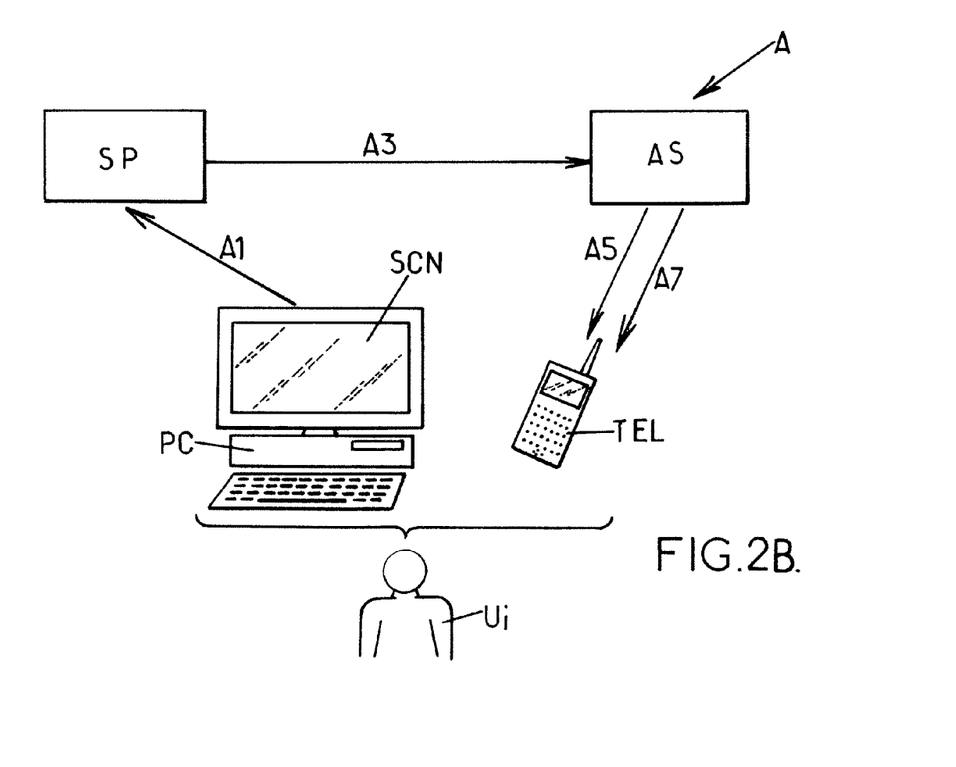
FIG. 2B represents a first embodiment of the system, implementing the enrollment step of the authentication method according to the principle of the invention.

FIG. 2B illustrates a first embodiment of a system implementing the enrollment step A according to the principle of the invention, as described above.

Such a system, aside from the elements already described in FIG. 1B, additionally comprises an authentication server AS which will generate the personalized application and certain confidential data associated with the user Ui upon receiving the request from the server SP of the service provider.

In this FIG. 2B, the different exchanges occurring during the enrollment step described in FIG. 2A are illustrated.

In particular, it indicates the data flows corresponding to the substep A1 of sending personal data to the server SP of the service provider, the substep A3 of sending the authentication server AS a request to generate the personalized application, the substep A5 of sending the mobile terminal the download link for the personalized application, and the substep A6 of sending the mobile terminal the activation code PIN for the personalized application.

In this first embodiment, the authentication server AS is separate from the server SP of the service provider. This embodiment is particularly suitable for applications for which the service provider does not want to manage the authentication of transactions and prefers to delegate this function to a third party operator.

Figure 2C:
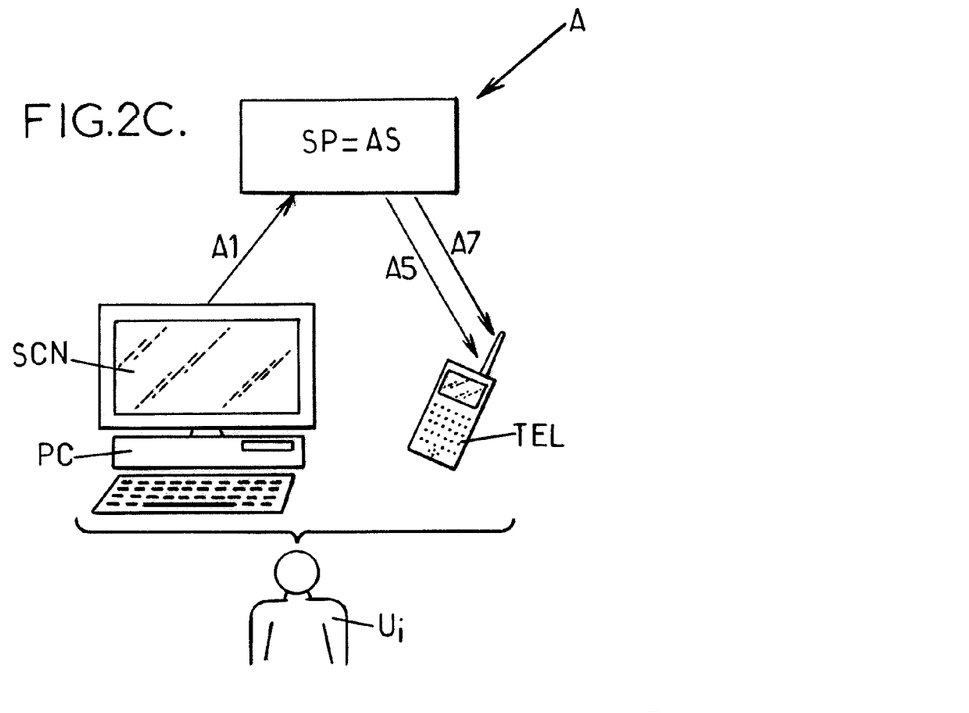
FIG. 2C represents a second embodiment of the system, implementing the enrollment step of the authentication method according to the principle of the invention.

FIG. 2C illustrates a second embodiment of a system implementing enrollment step A according to the principle of the invention, as described above.

Such a system differs from the system of the first embodiment of FIG. 2B in that the authentication server AS corresponds to the server SP of the service provider. In other words, the same server is used both to perform the authentication and to provide a service.

Such a server may be in the form of a server SP able to provide a service, on which are installed the authentication functionalities necessary to the authentication steps described in the present patent application, as complementary modules, for example in the form of complementary software modules.

In this embodiment, all the data flows corresponding to the substep A1 of sending personal data to the server SP of the service provider, the substep A3 of sending the authentication server AS a request to generate the personalized application, the substep A5 of sending the mobile terminal the download link for the personalized application, and the substep A6 of sending the mobile terminal the activation code PIN for the personalized application, therefore pass through a single server (designated as "SP=AS").

This second embodiment is particularly suitable for applications for which the service provider itself wants to manage the authentication of transactions, for security reasons. For example, this may be the case when the service provider is a bank allowing online transactions.

Figure 3A:
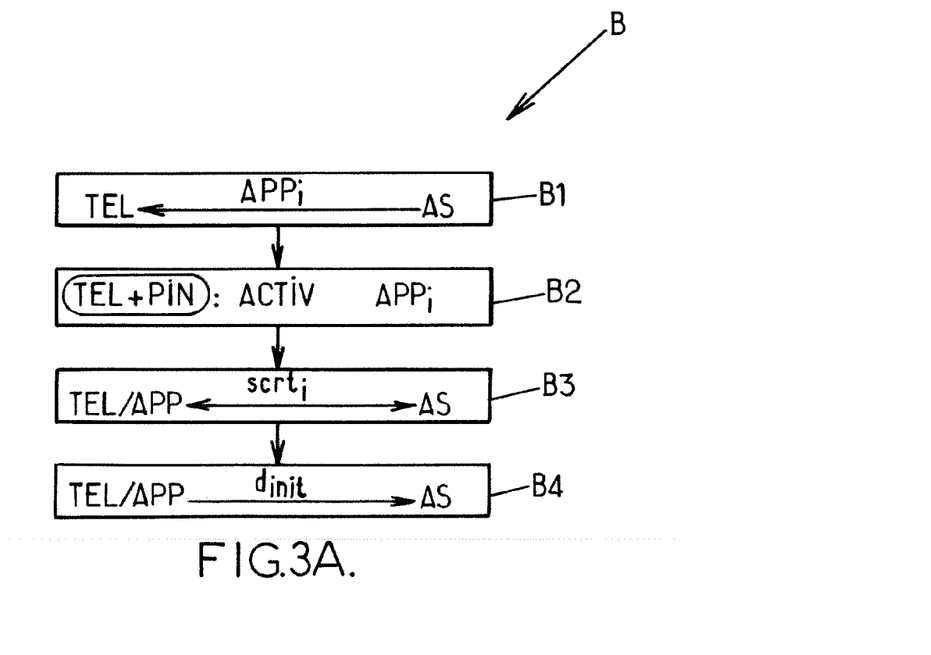
FIG. 3A illustrates the component substeps of the step of activating the personalized application according to an embodiment of the invention.

FIG. 3A illustrates the substeps of the step B of activating the personalized application according to an embodiment of the invention.

During a first substep B1, the user Ui downloads the personalized application to his mobile terminal, using the download link sent to him previously during the enrollment step A.

Once this personalized application is downloaded to the mobile terminal TEL, the personalized application can then be activated during a substep B2, advantageously by means of a code PIN previously received during the enrollment step A.

In one particular embodiment, confidential data generated during the enrollment step A are also downloaded during a substep B3.

Among these confidential data, specific data allowing the identification and authentication of transactions of the user Ui are downloaded.

Advantageously, these confidential data may also comprise one or more private encryption key(s), these keys then being used to encrypt the data subsequently exchanged between the server AS and the mobile terminal TEL, for example using an asymmetric (public key) encryption method.

These confidential data are securely stored both on the mobile terminal TEL and on the server AS, for example in an encrypted manner.

Advantageously, the confidential data stored on the authentication server AS are stored in HSM modules (Hardware Security Module) which avoids the possibility of being internally compromised within the operator managing the server AS. On the mobile terminal, the confidential data are encrypted before being stored in secure areas on the mobile terminal.

Once the personalized application is activated and if applicable the confidential data is transmitted, the initial authentication of the mobile terminal is recorded in a substep B4.

This substep B4 of recording the initial authentication allows legally guaranteeing that the authentication cannot later be retracted, which would then weaken the legal value of the entire authentication process.

This initial authentication step may be done by sending a certain amount of initial authentication data $d_{init}$ from the mobile terminal of the user Ui to the authentication server AS.

For example, the user Ui may be requested to present a government-issued proof of identity to the camera of his mobile terminal. The image of this proof of identity, captured by the camera, is then encrypted and sent to the server AS where it is stored. Such a process may be completely electronic, or may require human intervention to verify the identity of the user Ui.

Figure 3B:
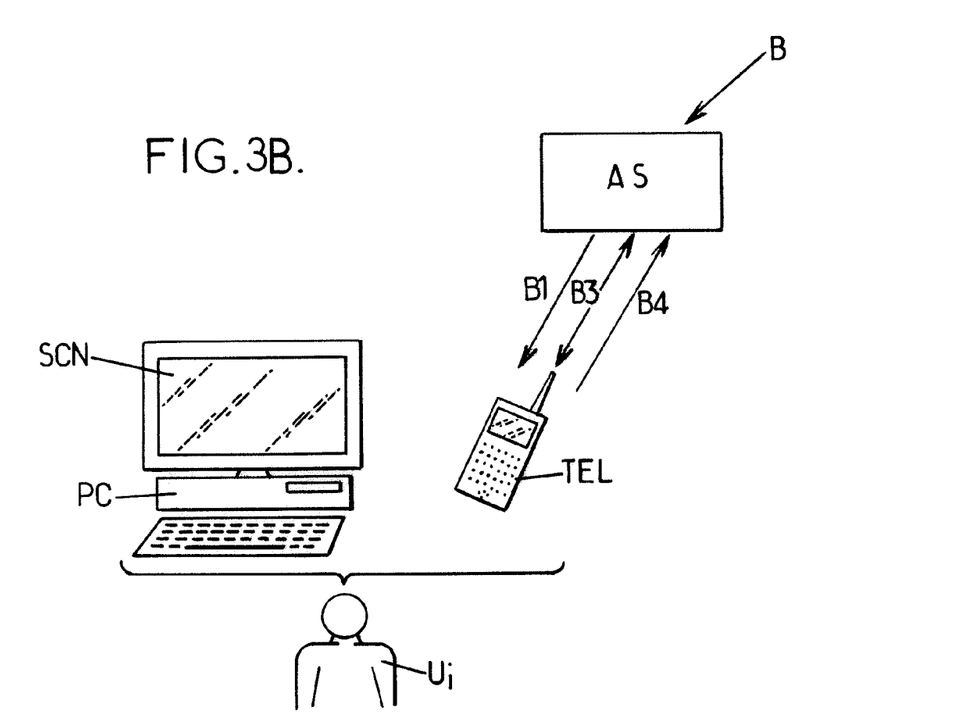
FIG. 3B illustrates a system implementing the step of activating the personalized application of the authentication method according to the principle of the invention.

FIG. 3B illustrates the system implementing step B of activating the personalized application according to the principle of the invention, as described above.

In this FIG. 3B, the different exchanges during the activation step described in FIG. 3A are illustrated.

In particular, it indicates the data flows corresponding to the substep B1 of downloading the personalized application to the mobile terminal TEL, the substep B3 of downloading the confidential data to the mobile terminal TEL, and the substep B4 of recording the initial authentication with the authentication server AS.

The server SP of the service provider as well as the computer PC of the user Ui are not concerned by this activation step.

Figure 4A:
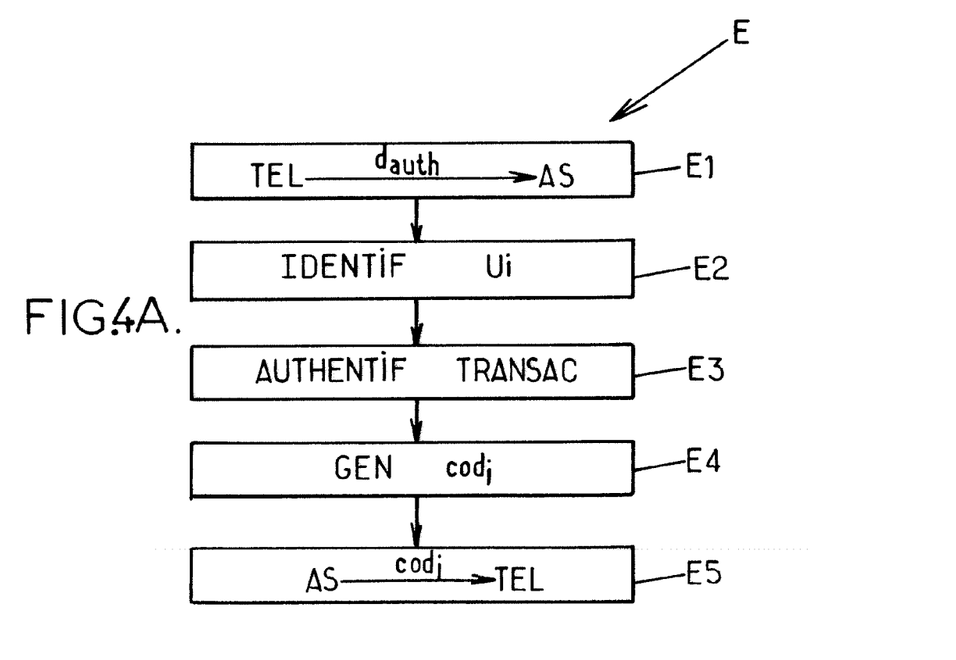
FIG. 4A illustrates the component substeps of the authorization code generation step of an authentication method according to a second embodiment, an "online" embodiment.

FIG. 4A illustrates the substeps of a second "online" type of embodiment of the authorization code generation step E.

In this second "online" embodiment, once the authentication data $d_{auth}$ has been read by the mobile terminal, it is sent to the authentication server AS during a transmission step E1.

In a first particular embodiment, the authentication data may be sent directly to the server AS, as read by the mobile terminal, which simplifies and accelerates the processing at the mobile terminal. In this first embodiment, the mobile terminal only has the function of reading the authentication data, and all the other processing is conducted on the authentication server AS.

In a second particular embodiment, the authentication data may be at least partially interpreted and processed on the mobile terminal in preparation for its transfer to the server AS. In particular, when a pair of private and public encryption keys has been downloaded from this authentication server AS during the activation step B, the authentication data can be encrypted before being sent to the server AS, for example with an asymmetric encryption process, in order to prevent anyone from accessing this authentication data.

In a third particular embodiment, the entire process of generating the authorization code can be done on the mobile terminal, in which case the authentication server AS only serves to perform functions unrelated to the generation of the authorization code, such as storing this code or managing the traceability of transactions made by the user.

Once the authentication data $d_{auth}$ has been sent to the authentication server AS, it is possible to perform a step of identifying the user Ui during an optional identification step E2, in order to ensure that this authentication data $d_{auth}$ was indeed sent by this user.

A substep E3 of authenticating the transaction requested by the user can then be carried out.

The actual authorization code $cod_i$ is then generated on the authentication server AS during a generation step E4.

Once this authorization code is generated, it is sent (code transmission step E5) from the authentication server AS to the mobile terminal TEL, possibly in encrypted form using one or more key(s) generated during the personalized application activation step B, in order to be displayed there, possibly after having been signed using a secret code (or even identification data of the mobile terminal) before being encoded as an image.

The value of the generated authorization code allows certifying that the authentication data has indeed been understood and authenticates the user.

In this second "online" type of embodiment of the authentication method, once the authorization code is read by the digital device of the user Ui (step F), and once the transaction data are sent with the captured authorization code, from the personal computer to the server of the service provider (step G), it is advantageous to execute a transaction timestamping step after the transaction itself, in order to preserve proof of the time and date the transaction was made.

In the case of the "online" embodiment, such timestamping can be done by the authentication server AS to maintain transaction traceability.

Figure 4B:
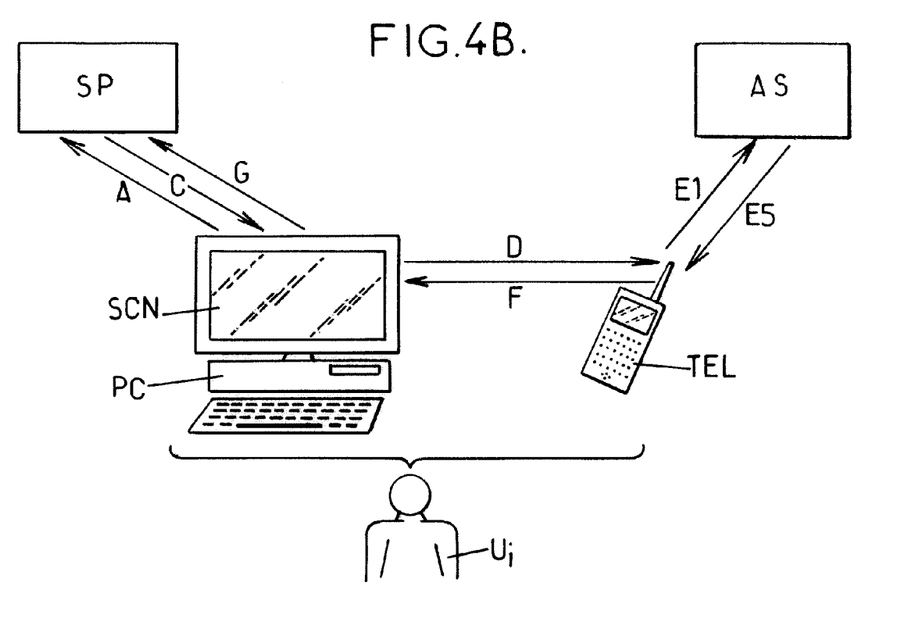
FIG. 4B illustrates a first embodiment of the system, implementing the authentication method according to the second "online" type of embodiment, where the authorization code is generated on an authentication server AS that is separate from the server of the service provider.

FIG. 4B illustrates the system implementing the authentication method according to a first "online" type of embodiment, where the authorization code is generated in an authentication server AS separate from the server of the service provider.

In particular, the flows of data corresponding to the steps of enrollment (step A), sending authentication data (step C), reading this authentication data (step D), obtaining the authorization code by the user's computer (step E), and sending the transaction to the server of the service provider (step G), are similar to those described in the "offline" embodiment and illustrated in FIG. 1B.

This first "online" embodiment is characterized by the mobile terminal transferring the authentication data to the authentication server AS during substep E1, the various substeps of identifying the user, authenticating the transaction, and generating the authorization code $cod_i$ (substeps E2 to E4) then being conducted on this authentication server AS before the authorization code $cod_i$ is sent to the mobile terminal during the transmission substep E5.

In this particular embodiment, once the transaction is done, it can be timestamped by the server SP of the service provider in order to serve as proof that is accessible to the service provider if needed. The history of the timestamped transactions is thus maintained within the server SP of the service provider.

Figure 4C:
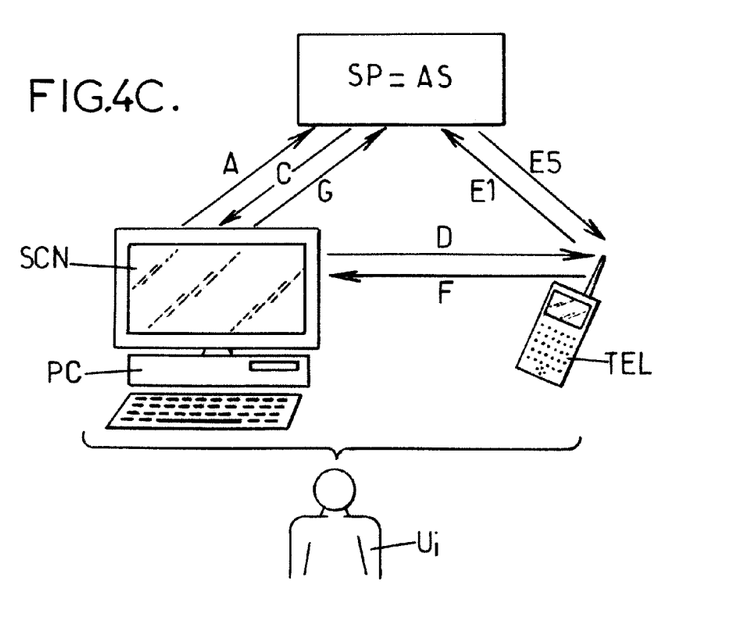
FIG. 4C illustrates a second embodiment of the system, implementing the authentication method according to the second "online" type of embodiment, where the authorization code is generated on the server of the service provider in which authentication functionalities have been installed.

FIG. 4C illustrates the system implementing the authentication method according to a second "online" type of embodiment, where the authorization code is generated on the server SP of the service provider on which the authentication functionalities described above have been installed.

In this FIG. 4C, the different data flows described are similar to those described with reference to FIG. 4B, with the only difference being that the authentication server AS and the server SP of the service provider form a single entity managed by the service provider.

This embodiment is particularly suitable for applications demanding an increased level of security, and in particular for banking where strict criteria on data confidentiality are applied in the exchanges of data between the transaction module and the authentication module.

In this particular embodiment, once made, this transaction can be timestamped both by the authentication module and by the server SP itself, to serve as proof that is accessible to the service provider if needed. The history of timestamped transactions is thus maintained within the server SP of the service provider.

The server SP can also store other traceability data such as the content of the transaction or the user identifier.

The authentication method described above allows resisting most, possibly all, known attacks identified in a context of transaction authentication and/or signature on the internet, which aim to compromise a communication between a client and a server and/or alter the operation. The list of such attacks is given below:

Malware Attack

This is a generic name for computer viruses, Trojan horses, spyware, keyloggers, etc. Malware (malicious software) are applications used for fraudulent purposes. They can access a computer through vulnerabilities in its protection using social engineering. When the malware is running, generally it can take complete control of the computer and, for example, steal the user's personal data and information, activate remote control of the computer, or execute actions in the name of the user.

With the invention, the only sensitive personal data are stored in a secure space, on the server of the service provider, and are out of the reach of malware.

Copying the personalized application to a mobile terminal other than the one of the user Ui is useless without the confidential data generated by the server AS. Similarly, copying the confidential data to another mobile terminal renders these confidential data unusable.

Keylogging Attack

Keylogging attacks occur using programs called keyloggers which often propagate through viruses, worms, or spyware. The principle of a keylogger is to spy on all actions performed on the user's computer (keyboard input, opening applications, moving files, etc.). The history of these actions is stored in a specific location, then sent to a mailbox or a web site. Highly confidential data can thus be extracted without the user's knowledge.

Some keyloggers are highly developed and have the ability to select the most important information. When the user is visiting his online banking site for example, they are able to identify and retrieve his bank codes. They can also recognize the content of his messages or know exactly what programs he runs.

With the invention, again, the personal data of the user Ui are neither stored nor used by the personalized application and the data allowing authentication are for one-time use. Keylogging is therefore ineffective.

Phishing Attack

During a phishing attack, the attacker uses email or instant messaging to draw the user to a web site that appears trustworthy, but is actually an exact copy of the original site controlled by the attacker. The email message and web site may, for example, be an exact copy of an online banking site commonly visited by the user. The user then believes that he is at a trustworthy site (for example, his bank site) and enters his personal identification data such as his password, a one-time password, or even his bank card number.

The attacker can then use the user's information to access his account or carry out fraudulent transactions without his knowledge (for example a wire transfer or an online payment if the bank card number is obtained).

With the invention, a phishing attack may possibly discover the single response to a given authentication data item. However, such a response cannot be reused because the authentication data transmitted by the service provider is generated and changes each time.

In a reinforced security mode, the authentication data allows mutual authentication, which leads to exposing the phishing site.

Pharming or Whaling Attack

These sub-categories of phishing attacks allow stealing information after having drawn the victim to a fake web site, even if the domain name is entered correctly.

A pharming attack is a computer hacking technique that exploits vulnerabilities in the DNS server. In this technique, a DNS request for a particular domain name does not return the true IP address of the domain name but that of a fraudulent site.

There exist two types of pharming attack.

The first type is achieved by modifying a local DNS server. The Internet users requesting a domain name are sent to the IP address of a fraudulent server.

The second type is achieved through malware which reconfigures the network parameters of infected hardware, whether it is a workstation or a router. This reconfiguration acts by redirecting the Internet user to the IP address of a fraudulent server, for predetermined domain names.

As for whaling, this is another subcategory of phishing attacks which targets high level individuals. These may be corporate executives or individuals highly placed in the hierarchy of a network in an attack on financial institutions. As the attack targets a single individual and is more personalized, it therefore becomes more convincing but also more difficult to detect.

With the invention, similarly to phishing attacks, pharming or whaling attacks may possibly discover the single response to a given authentication data item. However, such a response could not be reused because the authentication data sent by the service provider is generated and changes each time.

Man-in-the-Middle (MitM) Attack

The man in the middle attack, sometimes abbreviated MitM, is a type of attack in which a thief listens to a communication between two parties and falsifies the exchanges between the client and host in order to pass for one of the parties.

This attack must therefore involve three protagonists, the client, the server, and the attacker. The goal of the attacker is to pass for the client with the server and to pass for the server with the client. He thus becomes the man in the middle. This allows him to monitor all network traffic between the client and server, and to modify it as desired it in order to obtain information such as passwords, system access, etc.

Most of the time, such attacks are based on the use of hijacking techniques which consist of listening to the network using sniffer tools.

With the invention, all transactions are encrypted between the user Ui and the authentication server AS, rendering ineffective a MitM interception.

A MitM attack between the user Ui and the server SP of the service provider may intercept the authorization code, but this is for one-time use and is therefore not reusable.

A Man in the Middle attack is therefore without effect with the present invention.

Man-in-the-Browser (MitB)

Tools and user vigilance now allow identifying Man-in-the-Middle types of fake sites because their address may be incorrect. While some are encrypted, careful inspection of the web site certification can prove that the site does not really belong to whom it claims. In addition, when thieves attempt to connect to the web site (target of the attack) using a computer in the same country as the client, fraud detection systems could detect suspicious characteristics.

For these reasons, hackers have now developed a more sophisticated variant of MitM—the Main in the Browser or MitB attack.

In this variant, instead of intervening between the client computer and the web site of the bank, MitB interceptions act between the customer and his browser.

A MitB attack is designed by installing malware on the customer's computer. The goal is to give the attacker control over all applications and all non-secure devices connected to the user's computer.

This can occur when a customer opens an email attachment or downloads a file from a web site. Visiting a web site, or reading an email, may be sufficient for a thief to install the malware without the customer's permission. In certain cases, cyber criminals have tampered with existing legitimate web sites so that they infect their visitors. The client is unlikely to notice that something is different.

Conventional strong authentication technologies, such as e-banking for example, cannot protect against a Man-in-the-Browser attack. In fact, whether using conventional tokens such as OTP (Securid, Vasco, Aladdin, etc.) or PKI technology (digital certificate) on media such as a SmartCard or a USB token (eToken, etc.), these technologies do not offer a sufficient level of security to prevent Man in the Browser attacks.

With the invention, similarly to MitM attacks, all transactions are encrypted between the user Ui and the authentication server AS, which renders a MitB interception ineffective. A MitB attack between the user Ui and the server SP of the service provider may of course allow intercepting the authorization code, but this is for one-time use and is therefore not reusable.

A Man in the Browser attack is therefore without effect with the invention.

Identity Theft Attack

In this type of attack, the attacker claims to be someone else, for example in order to access a system or execute fraudulent financial transactions. This technique is based on the principle of identity theft. This always begins with collecting personal information about the target individual. The personal information may be the name, telephone number, date of birth, address, social security number, credit card number, credit card or debit card PIN, or any other information which allows identifying the person.

The proliferation of social networks such as FaceBook, MySpace, Linked-in, Twitter, Xing, Viadeo, etc., and their widespread use makes it easy to collect this information but also complicates keeping them secure.

The thieves then use this information to execute one or more transactions while assuming the identity of the target person. For example, a thief may make telephone calls or large purchases and pass on the costs to the targeted person. He can also withdraw money from that person's bank account.

With the invention, the personal data of the user are not used during the authentication process. An identity theft attack is therefore inoperable.

Social Engineering attack

This type of attack means making a person perform an action they would not have done on their own. Social engineering is a technique that works, because it relies on human characteristics such as helpfulness or trust. To achieve his ends, the attacker applies pressure in various ways such as:

friendship and cooperation: empathy, sympathy, concern, guilt. To do this, the context of the target must be known, as well as certain personal aspects of the subject. This method is relatively discreet but often requires several attempts.

Identity theft and intimidation: power and subjugation, distribution of responsibilities. This method is slightly more risky than the previous one. It is necessary to have a detailed company directory and org chart. This method is faster because as this method is aggressive, only one attempt is possible.

Sabotage: targets administrators. This involves making oneself known as the appropriate contact in case of an IS problem. The attacker then exploits the resulting confidence. This method is not very discreet but is effective.

Various associated techniques: trash recovering, which involves retrieving items from the trash; shoulder surfing, which involves looking over the target's shoulder.

The only means of fighting this remains user awareness. It is costly in terms of time and resources but it can be done. The best counter consists of withholding the information from the user, classifying it, and encrypting it using a physical and/or electronic authentication system (token, biometry, 2D code).

With the invention, as with any type of identity theft attack, a social engineering attack is ineffective because the personal data of the user are not used in the authentication process.

Cross-Channel Attack

In these attacks, a breach in the security of one channel is used to access other channels. The different security constraints between one channel and another explain why it is easier to attack one channel and perform fraudulent actions on another.

For example, the attacker could use personal data obtained on the online commerce channel to connect to the online bank. It is becoming necessary to keep domains separate in order to protect against this type of attack.

With the invention, the confidential data are specific to the service provider, which drastically reduces the possibilities of cross-channel attack.

In case of weakness due to too much sharing of services within a given group of suppliers, a cross-channel attack remains without effect, because it only allows intercepting confidential data for one-time use and therefore not reusable.

Card-not-Present Attack

In environments where a card is required (for example a payment card), this attack consists of a transaction during which the card is not present at the seller. This includes orders placed on the internet, or by telephone and by email, more commonly called MoTo (Mail Order/Telephone Order).

Unlike a transaction where the card is present and is generally combined with entering a PIN code only known to the user, when the card is not present the merchant can only verify that the transaction is actually made by the owner of the card. In effect, an attacker can copy the card information about its owner and then use it to make card-not-present transactions. With the online embodiment of the invention, user identification, authentication of the transaction, and timestamping are performed. This set of elements is therefore traceable.

Any regulations allowing technical repudiation would only allow repudiating the means and not the act, enabling irrefutable legal recourse.

The invention also concerns an authentication server AS comprising a receiving module arranged to receive the authentication data $d_{auth}$ as well as at least one internal identification data item $d_{int}$ coming from the server SP of the service provider, calculation means arranged to generate an authorization code $cod_i$ as a function of the authentication data received and at least one of the internal identification data items received, as well as a transmission module arranged to send the generated authorization code $cod_i$ to the mobile terminal TEL.

Such an authentication server AS can be used in the online embodiment as described in FIG. 4B, in which the transaction authentication functionality, done using the authentication data $d_{auth}$, is performed on a server separate from the service provider.

The invention also relates to a system of authenticating a user requesting a transaction with a service provider, comprising a screen SCN arranged to display authentication data received from the service provider, a mobile terminal TEL providing means for inputting the authentication data displayed on the screen and arranged to return an authorization code specific to the user and to the requested transaction, and entry means PC which allow sending the authorization code to the service provider in order to authenticate the user. This system is, for example, described in FIG. 1B. In one particular embodiment, this system involves an authentication server as described above.

In another particular embodiment, the system additionally comprises the server SP of the service provider, this server being arranged to provide this service requested by the user, and comprising a receiving module arranged to receive at least one personal data item of the user and the authorization code sent by the user, calculation means arranged to generate at least one internal identification data item from at least one of the personal data items received, and a transmission module arranged to send the generated internal identification data to the authentication server AS.

Such a service providing server SP can be used in an online embodiment as described in FIG. 4B, in which the service providing functionality is carried out on a server separate from the one doing the transaction authentication.

Of course, the invention is not limited to the example embodiments described and represented. From these examples, one can imagine other embodiments and other forms without leaving the scope of the invention.

Thus, all or part of the steps implemented by the mobile terminal TEL are carried out in an embodiment following the execution of computer program instructions on computing means of the mobile terminal TEL. Similarly, all or part of the steps implemented by the authentication server AS are carried out in an embodiment following the execution of computer program instructions on the computing means of this server AS.

The term service provider as used above covers any operator able to provide a service in which a transaction is conducted. Such a supplier may be, as some purely illustrative examples, a bank operator, an online game operator, a telecommunications carrier, a renter of vehicles or cycles, etc.

The invention claimed is:

1. Method for authenticating a user requesting a transaction with a service provider, said method comprising, prior to the transaction:

an enrollment step, during which an activation code is sent to a mobile terminal;

an activation step during which a personalized application specific to the user and downloaded from an authentication server is downloaded to the mobile terminal, said activation code being used during the activation step to activate the downloaded personalized application; and at the time of the transaction:
- using authentication data read on a screen by means of the personalized application of the mobile terminal to generate an authorization code that is specific to the user and to the requested transaction;
- reading the authorization code, displayed by the mobile terminal, using the reading means of a digital device; and
- sending the read authorization code from said digital device to the service provider in order to authenticate the user.

2. Authentication method according to claim 1, wherein the authorization code is generated by signing the authentication data using a secret code entered by the user on the mobile terminal.

3. Authentication method according to claim 2, wherein the authorization code is generated by additionally signing the authentication data using identification data of the mobile terminal.

4. Authentication method according to claim 1, wherein the generated authorization code is encoded in the form of an image, in particular a matrix barcode, before being displayed by the mobile terminal.

5. Authentication method according to claim 1, wherein the authorization code is read by means of a near field communication wireless technology.

6. Authentication method according to claim 1, comprising the transmission of the read authentication data from the mobile terminal to the authentication server, the generation of the authorization code from the authentication data on the authentication server, and the transmission of the generated authorization code to the mobile terminal.

7. Authentication method according to claim 1, wherein the enrollment step comprises a step of verifying the identity of the user before sending the activation code, and only sending the code if said verification is positive.

8. Authentication method according to claim 1, wherein the activation step comprises the transmission of at least one confidential data item specific to the user of the mobile terminal, said confidential data item being used to encrypt the authenticate data in the mobile terminal before its transmission to the authentication server and/or to decrypt the authorization code received by the mobile terminal.

9. Authentication method according to claim 1, comprising the generation, during the prior enrollment step, of the personalized application and/or the confidential data as a function of at least one internal identification data item generated from at least one personal identification data item sent by the user to the service provider.

10. Authentication method according claim 1, wherein the authentication data are generated by the service provider as a function of data related to the transaction and personal data received from the user.

11. Authentication server comprising a receiving module arranged to receive authentication data sent by a mobile terminal and at least one internal identification data item sent by a server of a service provider, calculation means arranged to generate an authorization code as a function of the authentication data received and at least one of the internal identification data items received, and a transmission module arranged to send the generated authorization code to the mobile terminal.

12. System for authenticating a user requesting a transaction with a service provider, said system comprising:
- a server arranged to send an activation code to a mobile terminal prior to the transaction;
- an authentication server arranged to propose to the mobile terminal to download a personalized application specific to the user, said activation code being used to activate the downloaded personalized application;
- a screen arranged to display authentication data received from the service provider;
- a mobile terminal comprising means for inputting the authentication data displayed on the screen and display means arranged to display an authorization code specific to the user and to the requested transaction; and
- a digital device comprising reading means able to read the authorization code displayed by the mobile terminal and adapted to send said authorization code to the service provider in order to authenticate the user.

13. Authentication system according to claim 12, wherein it additionally comprises an authentication server comprising a receiving module arranged to receive authentication data sent by a mobile terminal and at least one internal identification data item sent by a server of a service provider, calculation means arranged to generate an authorization code as a function of the authentication data received and at least one of the internal identification data items received, and a transmission module arranged to send the generated authorization code to the mobile terminal.

14. Authentication system according to claim 13, wherein it comprises a service server, used by the service provider to provide a service requested by the user, said service server comprising a receiving module arranged to receive at least one personal data item of the user and the authorization code sent by the user, calculation means arranged to generate at least one internal identification data item from at least one of the personal data items received, and a transmission module arranged to send the generated internal identification data to the authentication server.

* * * * *